(12) United States Patent
Andoh

(10) Patent No.: US 9,102,420 B2
(45) Date of Patent: Aug. 11, 2015

(54) ORBIT INSERTION DEVICE FOR ARTIFICIAL SATELLITE AIMED TO EXPLORE A PLANET OF UNKNOWN CHARACTERISTICS

(71) Applicant: Fukashi Andoh, Toyota (JP)

(72) Inventor: Fukashi Andoh, Toyota (JP)

( * ) Notice: Subject to any disclaimer, the term of this patent is extended or adjusted under 35 U.S.C. 154(b) by 194 days.

(21) Appl. No.: 13/918,919

(22) Filed: Jun. 15, 2013

(65) Prior Publication Data

US 2014/0367524 A1 Dec. 18, 2014

(51) Int. Cl.
*B64G 1/10* (2006.01)
*B64G 1/24* (2006.01)

(52) U.S. Cl.
CPC ..................................... *B64G 1/242* (2013.01)

(58) Field of Classification Search
CPC ............ B64G 1/10; B64G 1/007; B64G 1/24; B64G 1/242; B64G 2001/245; B64G 2001/247
USPC ........ 244/258.4–158.6, 172.2; 701/3, 13, 531
See application file for complete search history.

(56) References Cited

U.S. PATENT DOCUMENTS

| | | | | |
|---|---|---|---|---|
| 3,305,671 A | * | 2/1967 | Manoni, Jr. | 701/400 |
| 3,305,672 A | * | 2/1967 | Paulson | 701/400 |
| 3,350,548 A | * | 10/1967 | Whitaker | 700/30 |
| 7,107,007 B1 | * | 9/2006 | Lee et al. | 455/13.1 |
| 2013/0327893 A1 | * | 12/2013 | Lee et al. | 244/158.6 |

* cited by examiner

*Primary Examiner* — William Gilbert

(57) ABSTRACT

An orbit insertion device for artificial satellite aiming to explore a planet with unknown characteristics. A plurality of sensors send a plurality of measured states of the artificial satellite. A planetary attraction constant estimator calculates a planetary attraction constant based on the plurality of measured states. A drag force coefficient estimator calculates a drag force coefficient based on the plurality of measured states. A rate of convergence calculation unit calculates a rate of convergence based on the drag force coefficient. A fictitious control calculation unit calculates a fictitious control based on the planetary attraction constant, the drag force coefficient and the rate of convergence. A normalized thrust calculation unit calculates a normalized thrust based on the fictitious control. A plurality of thrusters generate a thrust based on the normalized thrust.

1 Claim, 3 Drawing Sheets

ORBIT INSERTION DEVICE FOR ARTIFICIAL SATELLITE AIMED TO EXPLORE A PLANET OF UNKNOWN CHARACTERISTICS

BACKGROUND OF THE INVENTION

The present invention relates to an orbit insertion device for artificial satellite aimed to explore a planet of unknown characteristics such as planetary mass density, planetary radius and atmospheric composition.

U.S. Pat. No. 5,595,360 discloses an apparatus for translating a spacecraft from one orbit to another by generating a thrust of a force in timing sequences, both of which are predetermined based on known characteristics of a planet. U.S. Pat. No. 6,213,432 discloses a method for inserting a space vehicle into a target orbit of a planet through a spiral trajectory pre-calculated based on known characteristics of a planet. U.S. Pat. No. 6,341,749 B1 discloses an apparatus for translating a spacecraft from an orbit to another using a non-linearly varying thrust minimizing transfer time and fuel calculated based on known characteristics of a planet.

The prior arts in U.S. Pat. Nos. 5,595,360, 6,213,432, and 6,341,749 B1, if applied to orbit insertion for artificial satellite aimed to explore a planet of unknown characteristics, fail to insert the artificial satellite into a target orbit since the prior arts are not able to calculate a thrust required by an orbit insertion without a pre-knowledge on the characteristics of the planet.

SUMMARY OF THE INVENTION

The present invention provides an orbit insertion device for artificial satellite aimed to explore a planet of unknown characteristics.

The orbit insertion device includes:
a planetary attraction constant estimator receiving the plurality of measured states, and calculating the planetary attraction constant, which is a product of gravitational constant and planetary mass, as a polynomial of the radial coordinate, a radial acceleration and an angular speed, where the radial acceleration is a second order time derivative of the radial coordinate, and the angular speed is a first order time derivative of the angular coordinate;
a drag force coefficient estimator receiving the plurality of measured states, and calculating the drag force coefficient, which is a drag force acting on the artificial satellite in radial direction with respect to a planetary center divided by a product of planetary mass, an opposite sign of radial speed and squared radial speed, as a polynomial of the radial speed and a function of the radial coordinate monotonically decreasing with respect to increasing radial coordinate;
a rate of convergence calculation unit receiving the drag force coefficient, and calculating the rate of convergence, with which the radial coordinate of the artificial satellite approaches to radius of the target orbit, as a linear combination of the drag force coefficient divided by the radial speed and a small quantity;
a fictitious control calculation unit receiving the planetary attraction constant, the drag force coefficient and the rate of convergence, and calculating the fictitious control, which is a centripetal acceleration required to propel the artificial satellite to the target orbit, as a linear combination of the planetary attraction constant divided by the radial coordinate squared, the drag force coefficient, a product of the rate of convergence and the radial speed, and a small quantity; and
a normalized thrust calculation unit receiving the fictitious control, and calculating a normalized thrust, the thrust normalized with respect to a satellite mass, as a product of the radial coordinate and a first order time derivative of a square root of the fictitious control divided by the radial coordinate.

This construction utilizing the estimated planetary attraction constant, the estimated drag force coefficient and the fictitious control make possible an orbit insertion without a prior knowledge about the planet explored with more certainty than the prior arts. With this construction, the time required to complete an orbit insertion is minimized, since this construction allows a direct orbit insertion without passing through intermediate orbits before arriving at the target orbit.

BRIEF DESCRIPTION OF THE DRAWINGS

The novel features of the invention will be readily understood and appreciated by reference to the following detailed description taken in conjunction with the drawings, in which.

DETAILED DESCRIPTION OF THE INVENTION

Figure 1:
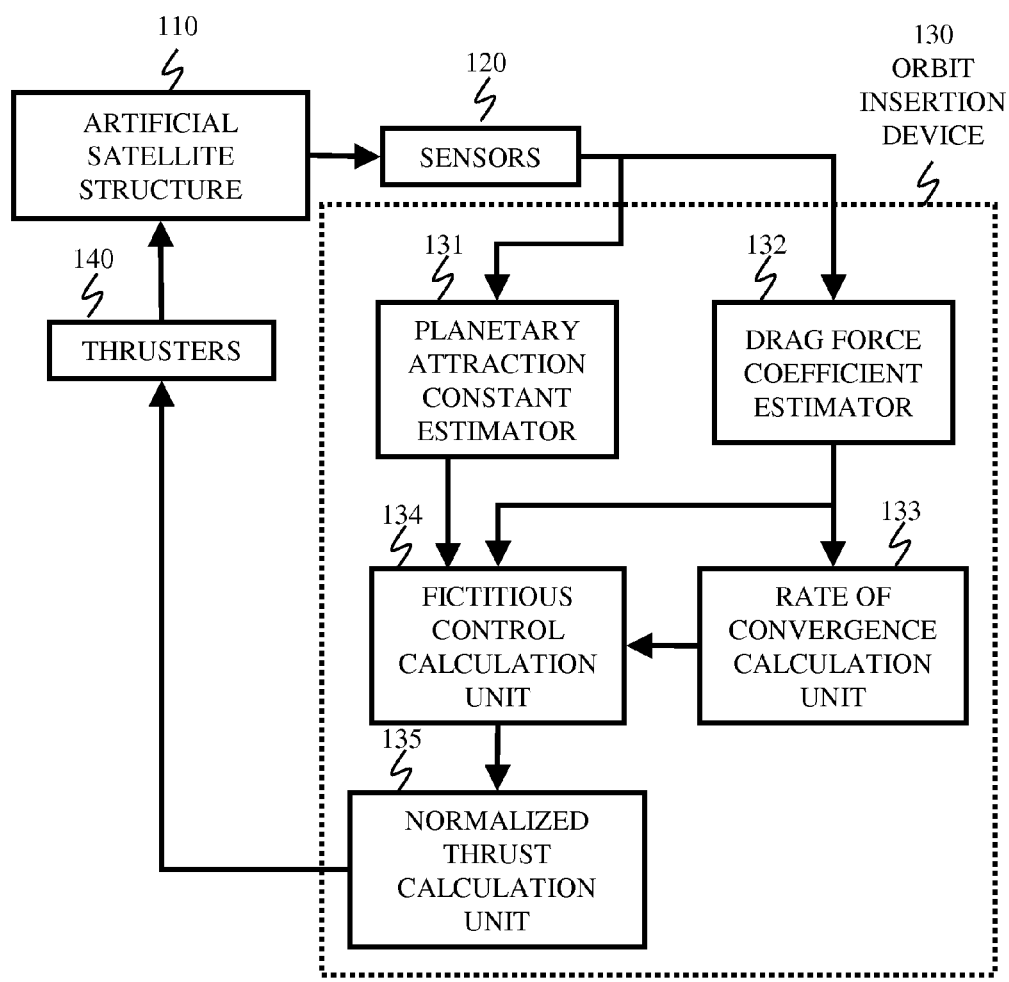
FIG. 1 is a block diagram of an orbit insertion device for artificial satellite in accordance with an exemplary embodiment of the invention.

FIG. 1 is a block diagram of an orbit insertion device for artificial satellite in accordance with an exemplary embodiment of the invention. The artificial satellite includes: an artificial satellite structure 110, a plurality of sensors 120, an orbit insertion device 130 and a plurality of thrusters 140.

The artificial satellite structure 110 is a mechanical structure of an artificial satellite including a plurality of solar arrays, a plurality of propellant tanks, a plurality of propulsion systems that forms a basic shape of the artificial satellite, and mounts the plurality of sensors 120, the orbit insertion device 130 and the plurality of thrusters 140.

The plurality of sensors 120 measure radial coordinate and angular coordinate of the artificial satellite in a polar coordinate system with respect to planetary center, and send them to the orbit insertion device 130 as a plurality of measured states. Examples of the plurality of sensors 120 include but are not limited to static horizon sensor, scanning horizon sensor, and star sensor where the static horizon sensor and the scanning horizon sensor measure position of the artificial satellite with respect to the planet explored using infrared radiation from the planet, and the star sensor measures the position of the artificial satellite with respect to a star around which non-stellar objects including the planet explored are gravitationally bound in orbit.

The orbit insertion device 130 estimates planetary attraction constant which is a product of gravitational constant and planetary mass as a function of the radial coordinate and the angular coordinate, estimates drag force coefficient as a monotonic function of radial coordinate, calculates rate of convergence of the radial coordinate to target orbit radius as a function of estimated drag force coefficient, calculates fictitious control as a function of the estimated planetary attraction constant and the estimated drag force coefficient, calculates normalized thrust as a function of the fictitious control and sends a control signal to cause the plurality of thrusters 140 generate thrust, magnitude of which is a product of the normalized thrust and the satellite mass, in the direction of travel. Detailed description of the orbit insertion device 130 is given together with its functional configuration in what follows.

The orbit insertion device 130 further includes: a planetary attraction constant estimator 131, a drag force coefficient estimator 132, a rate of convergence calculation unit 133, a fictitious control calculation unit 134 and a normalized thrust calculation unit 135.

The planetary attraction constant estimator 131 receives the plurality of measured states, and calculates the planetary attraction constant, which is a product of gravitational constant and planetary mass, as a polynomial of the radial coordinate, a radial acceleration and an angular speed, where the radial acceleration is a second order time derivative of the radial coordinate, and the angular speed is a first order time derivative of the angular coordinate.

The drag force coefficient estimator 132 receives the plurality of measured states, and calculates the drag force coefficient, which is a drag force acting on the artificial satellite in radial direction with respect to a planetary center divided by a product of planetary mass, an opposite sign of radial speed and squared radial speed, as a polynomial of the radial speed and a function of the radial coordinate monotonically decreasing with respect to increasing radial coordinate.

The rate of convergence calculation unit 133 receives the drag force coefficient, and calculates the rate of convergence, with which the radial coordinate of the artificial satellite approaches to radius of the target orbit, as a linear combination of the drag force coefficient divided by the radial speed and a small quantity.

The fictitious control calculation unit receives the planetary attraction constant, the drag force coefficient and the rate of convergence, and calculates the fictitious control, which is a centripetal acceleration required to propel the artificial satellite to the target orbit, as a linear combination of the planetary attraction constant divided by the radial coordinate squared, the drag force coefficient, a product of the rate of convergence and the radial speed, and a small quantity.

The normalized thrust calculation unit 135 receives the fictitious control, and calculates the normalized thrust as a product of the radial coordinate and a first order time derivative of a square root of the fictitious control divided by the radial coordinate.

The plurality of thrusters 140 generate a thrust which is a product of the normalized thrust and a satellite mass in a direction of travel, and propels the artificial satellite to a target orbit.

Derived in what follows is a principle whereby the orbit insertion device 130 calculates the normalized thrust.

Equations of motion of an artificial satellite are given as (1) and (2).

$$\ddot{r} - \dot{\theta}^2 r = \begin{cases} -\dfrac{k}{r^2} & r \gg r_0 \\ -\dfrac{k}{r^2} + d_r & r \approx r_0 \end{cases} \quad (1)$$

$$\ddot{\theta} r = f_\theta \quad (2)$$

where r is a radial coordinate of the artificial satellite in a polar coordinate system with respect to planetary center (hereinafter referred to as "radial coordinate") [m], θ is an angular coordinate of the artificial satellite in the polar coordinate system with respect to planetary center (hereinafter referred to as "angular coordinate") [rad], k is a product of gravitational constant and planetary mass (hereinafter referred to as "planetary attraction constant") [N·m²/kg] where the gravitational constant is $6.674 \times 10^{-11}$ [N·m²/kg²], $d_r$ is a radial drag force due to atmosphere of a planet normalized with respect to satellite mass (hereinafter referred to as "normalized radial drag force") [m/s²], $f_\theta$ is thrust of the artificial satellite in the direction of travel normalized with respect to satellite mass (hereinafter referred to as "normalized thrust") [m/s²], and $r_0$ is target orbit radius [m].

For $r \gg r_0$ the planetary attraction constant is estimated using (1) as (3).

$$\hat{k} = r^2(\dot{\theta}^2 r - \ddot{r}) \quad (3)$$

where $\hat{k}$ is estimated planetary attraction constant [N·m²/kg].

The normalized radial drag force $d_r$ in (1) is expressed as (4).

$$d_r = -\text{sgn}(\dot{r})\dot{r}^2 c(r), \ c(r) > 0 \quad (4)$$

where c(r) is a function of the radial coordinate monotonically decreasing with respect to increasing radial coordinate (hereinafter referred to as "drag force coefficient") [N/m²].

The drag force coefficient is estimated using (1), (3), (4) as (5).

$$\hat{c}(r) = -\text{sgn}(\dot{r})\dfrac{1}{\dot{r}^2}\left(\ddot{r} - \dot{\theta}^2 r + \dfrac{\hat{k}}{r^2}\right) \quad (5)$$

where $\hat{c}(r)$ is estimated drag force coefficient [N/m²].

Hereinafter, the normalized thrust $f_\theta$ in (2) is designed such that the trajectory of the artificial satellite converges to a circular orbit with the target orbit radius around the planetary center. A variable in (6) is introduced.

$$s = \dot{r} + \sigma r - \sigma r_0 \quad (6)$$

where s is a hyper plane variable [m/s], vanishing of which causes the trajectory of the artificial satellite to converge to a circular orbit with the target orbit radius around the planetary center, and σ is a rate of convergence [s⁻¹].

Next a candidate for Lyapunov function is introduced as in (7).

$$V = \tfrac{1}{2}s^2 > 0, \ \forall s \neq 0 \quad (7)$$

where V is the candidate for Lyapunov function [m²/s²].

Taking a first order time derivative of (7) yields (8).

$$\dot{V} = s\dot{s} \quad (8)$$
$$= s\left(\dot{\theta}^2 r - \dfrac{k}{r^2} + d_r + \sigma\dot{r}\right)$$

According to Lyapunov's second theorem the hyper plane variable s converges to zero if (9) holds.

$$\operatorname{sgn}\left(\dot{\theta}^2 r - \frac{k}{r^2} + d_r + \sigma\dot{r}\right) = -\operatorname{sgn}(s), \forall_s \neq 0 \quad (9)$$

Since (2) can be rewritten as (10), centripetal acceleration $\dot{\theta}^2 r$ is treated as a fictitious control to make (9) hold.

$$f_\theta = r \frac{d}{dt} \sqrt{\frac{\dot{\theta}^2 r}{r}} \quad (10)$$

Sufficient condition for (9) is derived from (9) as (11).

$$\dot{\theta}^2 r < \frac{k}{r^2} + d_r + \sigma\dot{r} \land \sigma \geq -\frac{d_r}{\dot{r}} \quad \text{for } s > 0 \land \dot{r} > 0$$

$$\dot{\theta}^2 r < \frac{k}{r^2} + d_r + \sigma\dot{r} \land \sigma \leq -\frac{d_r}{\dot{r}} \quad \text{for } s > 0 \land \dot{r} < 0 \quad (11)$$

$$\dot{\theta}^2 r < \frac{k}{r^2} \quad \text{for } s > 0 \land \dot{r} = 0$$

$$\dot{\theta}^2 r > \frac{k}{r^2} + d_r + \sigma\dot{r} \quad \text{for } s < 0$$

From (10) and (11), the normalized thrust $f_\theta$ and the rate of convergence $\sigma$ satisfying (9) are obtained as (12).

$$f_\theta = r \frac{d}{dt}\sqrt{\frac{f_r}{r}} \quad (12)$$

$$f_r = \frac{\hat{k}}{r^2} + d_r + \sigma\dot{r} - \varepsilon_f, \sigma = -\frac{d_r}{\dot{r}} + \varepsilon_\sigma \quad \text{for } s > 0 \land \dot{r} > 0$$

$$f_r = \frac{\hat{k}}{r^2} + d_r + \sigma\dot{r} - \varepsilon_f, \sigma = -\frac{d_r}{\dot{r}} - \varepsilon_\sigma \quad \text{for } s > 0 \land \dot{r} < 0$$

$$f_r = \frac{\hat{k}}{r^2} - \varepsilon_f \quad \text{for } s > 0 \land \dot{r} = 0$$

$$f_r = \frac{\hat{k}}{r^2} + d_r + \sigma\dot{r} + \varepsilon_f \quad \text{for } s < 0$$

$$\varepsilon_f > 0, \varepsilon_\sigma > 0$$

where $f_r$ is the fictitious control [m/s²], $\varepsilon_f$ and $\varepsilon_\sigma$ are small quantities.

With the normalized thrust $f_\theta$ and the rate of convergence $\sigma$ in (12), the hyper plane variable in (6) converges to zero and the radial coordinate r converges to the target orbit radius $r_0$.

Figure 2:
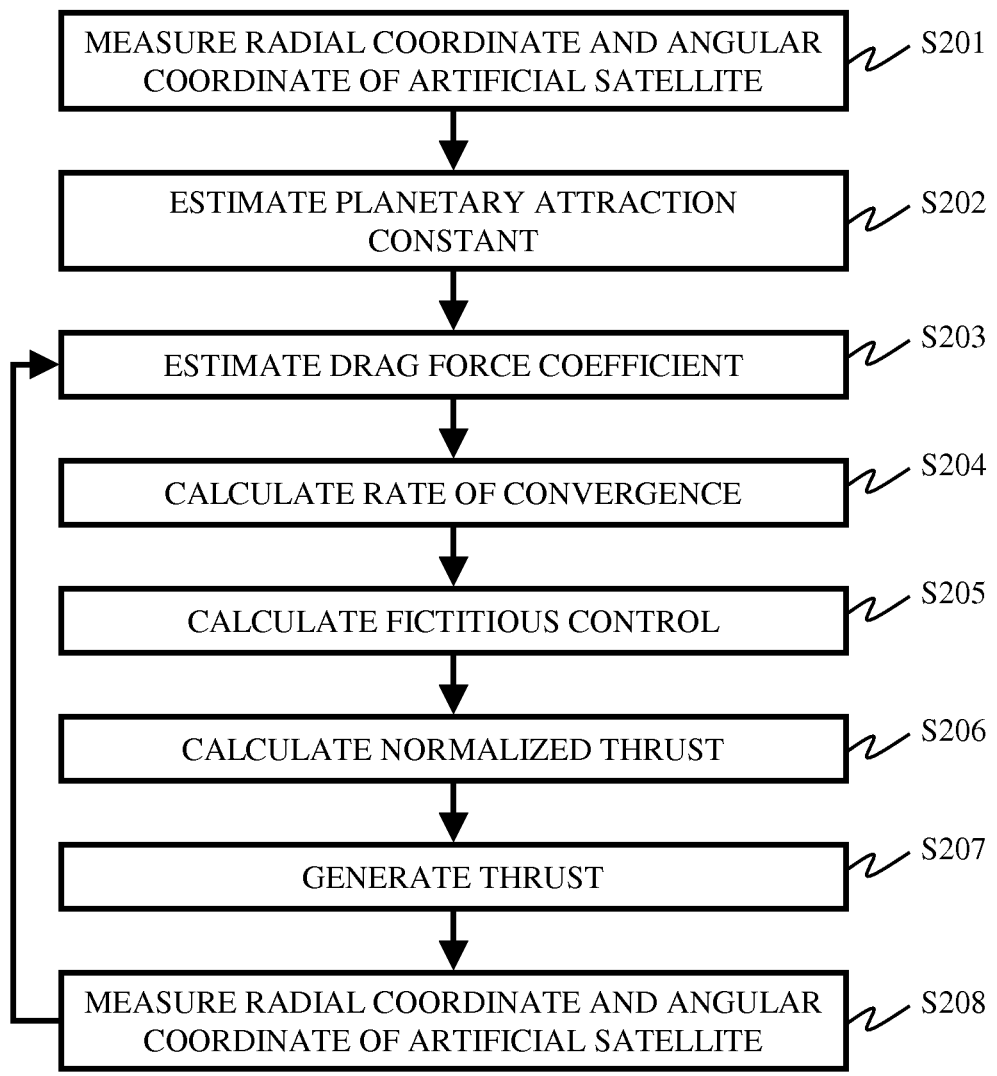
FIG. 2 is a flowchart showing a processing flow of the orbit insertion device for artificial satellite in accordance with an exemplary embodiment of the invention.

Next a processing flow of the orbit insertion device for artificial satellite is described using FIG. 2. FIG. 2 is a flowchart showing a processing flow of the orbit insertion device for artificial satellite in accordance with an exemplary embodiment of the invention. The plurality of sensors 120 measure radial coordinate r and angular coordinate θ of the artificial satellite in a polar coordinate system with respect to planetary center, and send them to the orbit insertion device 130 as a plurality of measured states (S201).

In the orbit insertion device 130, the planetary attraction constant estimator 131 estimates the planetary attraction constant using (3) and send it to the fictitious control calculation unit 134 as the estimated planetary attraction constant $\hat{k}$ (S202).

The drag force coefficient estimator 132 estimates the drag force coefficient using (5) and sends it to the rate of convergence calculation unit 133 and the fictitious control calculation unit 134 as the estimated drag force coefficient $\hat{c}(r)$ (S203).

The rate of convergence calculation unit 133 calculates the rate of convergence σ using (12) and sends it to the fictitious control calculation unit 134 (S204).

The fictitious control calculation unit 134 calculates the fictitious control $f_r$ using (12) and sends it to the normalized thrust calculation unit 135 (S205).

The normalized thrust calculation unit 135 calculates the normalized thrust $f_\theta$ using (12) and sends it to the plurality of thrusters 140 (S206).

The plurality of thrusters 140 generate a thrust which is a product of the normalized thrust $f_\theta$ and a satellite mass in a direction of travel (S207).

The plurality of sensors 120 measure radial coordinate r and angular coordinate θ of the artificial satellite, and steps S203 through S207 are repeated to propel the artificial satellite to the target orbit (S208).

Hereinafter, simulation results of aforementioned control processes of the orbit insertion device for artificial satellite in accordance with an exemplary embodiment of the invention are described in detail. The simulation assumes a space mission wherein an artificial satellite attempts to enter into a stable orbit around a planet. Parameters used in the simulation are given in (13).

$$m_p = 5.68 \times 10^{26} [kg], G = 6.674 \times 10^{-11} [N \cdot m^2/kg^2],$$
$$k = m_p G [N \cdot m^2/kg],$$

$$r_p = 60 \times 10^6 [m], r_0 = 1.01 r_p [m], r(0) = 1.02 r_0 [m], T = 0.1 [s] \quad (13)$$

where $m_p$ is the planetary mass [kg], $r_p$ is planetary radius [m], r(0) is an initial condition of the radial coordinate [m], and T is a sampling time of the orbit insertion device 130 [s].

Figure 3:
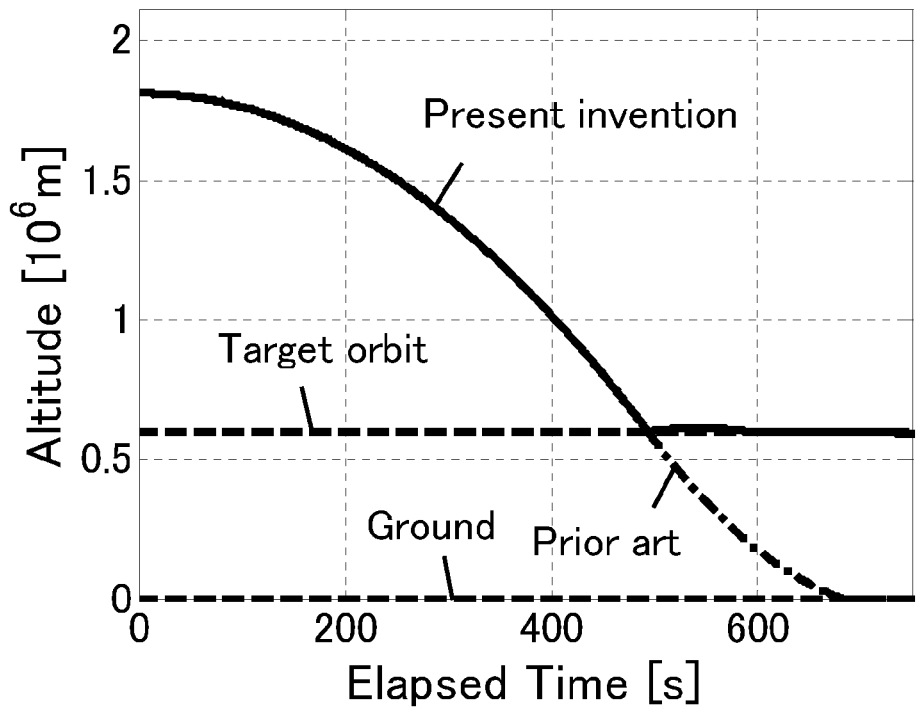
FIG. 3 is a simulation result of an exemplary embodiment of the invention showing radial coordinate due to orbit insertion control with the present invention.

FIG. 3 is a simulation result of an exemplary embodiment of the invention showing radial coordinate due to orbit insertion control with the present invention. In FIG. 3 a solid line represents altitude of the artificial satellite (hereinafter referred to as "the artificial satellite altitude") with the present invention, a broken line represents the one with the prior art and a dashed line represents altitude of the target orbit (hereinafter referred to as "the target orbit altitude") where altitude is the difference between the radial coordinate r and the planetary radius $r_p$. The prior art in this simulation utilizes an orbit transfer control described in U.S. Pat. No. 5,595,360, wherein propulsion thrusters are fired in timing sequences predetermined based on a planetary mass incorrectly estimated as $3.12 \times 10^{22}$ [kg] in relation to measured position of the artificial satellite relative to the planet. Such incorrect estimation is due to limited information available about the planetary density, and in this simulation the planetary density is estimated $5.49 \times 10^{-5}$ times as small as a true value. As in FIG. 3 the artificial satellite altitude with the present invention approaches and converges to the target orbit altitude, since the present invention is based on the planetary attraction constant correctly estimated by (3), and the normalized radial drag force correctly estimated by (4) and (5). On the other hand, the artificial satellite altitude with the prior art continues to decrease after reaching the target orbit altitude at 492 [s] until the artificial satellite plummets to the ground of the planet at 683 [s], since the prior art generates thrust based on the planetary attraction constant derived from incorrectly pre-calculated planetary mass that is insufficient to lift the artificial satellite back to the target orbit.

Figure 4:
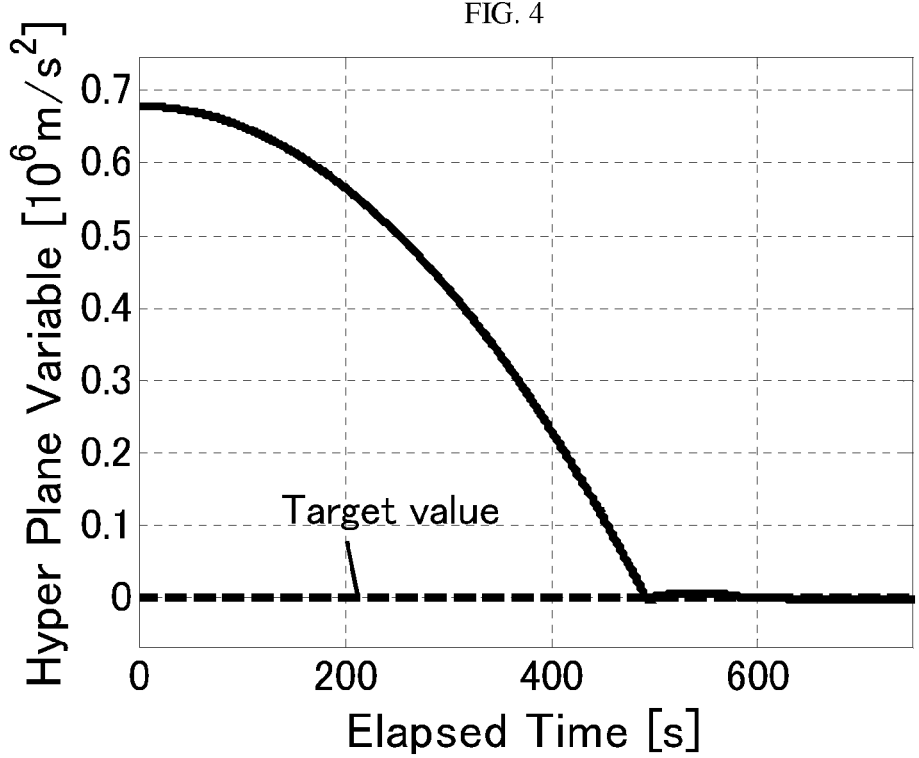
FIG. 4 is a simulation result of an exemplary embodiment of the invention showing hyper plane variable.

FIG. 4 is a simulation result of an exemplary embodiment of the invention showing hyper plane variable. In FIG. 4 a solid line represents the hyper plane variable with the present invention and the dashed line represents a target value of the hyper plane variable with which the candidate of Lyapunov function in (7) monotonically decreases. As in FIG. 4 the hyper plane variable reaches the target value at 492 [s] and stays in the vicinity of the target value.

Although, in the foregoing embodiment, a circular target orbit is considered, the present invention can also be applied to an elliptical orbit with arbitrary eccentricity by replacing the target orbit radius $r_0$ with a target distance from a center of the planet, which is a function of angular coordinate $\theta$.

The orbit insertion device for artificial satellite in the foregoing embodiment can be realized as an electrical/electronic/programmable electronic system. Examples of the electrical/electronic/programmable electronic system include but are not limited to a control system comprising an application specific integrated circuit (ASIC) and a microcontroller.

In the above simulation, the planet, an orbit of which the artificial satellite is deployed on, is a solid planet. The present invention can be applied without any modifications to a gas planet.

While, in the foregoing embodiment, a single stage orbit insertion, wherein the artificial satellite is inserted to the target orbit without passing through intermediate orbits, is discussed, successive application of aforementioned control procedure allows the present invention to propel the artificial satellite to the target orbit by a multiple stage orbit insertion wherein the artificial satellite passes through a plurality of intermediate orbits before arriving at the target orbit.

The described embodiments of the current invention are only exemplary and numerous variations thereof apparent to those skilled in the art are intended to be within the scope of the present invention as defined in the following claims.

The invention claimed is:

1. An orbit insertion device for an artificial satellite comprising an artificial satellite structure including a plurality of solar arrays, a plurality of propellant tanks, and a plurality of propulsion systems that forms a basic shape of the artificial satellite; a plurality of sensors for measuring a radial coordinate and an angular coordinate of the artificial satellite in a polar coordinate system with respect to a planetary center and sending them as a plurality of measured states that is a plurality of electrical signals representing a measured radial coordinate and a measured angular coordinate of the artificial satellite; and a plurality of thrusters for generating a thrust for propelling the artificial satellite to a target orbit, the orbit insertion device comprising:

a planetary attraction constant estimator receiving the plurality of measured states, and calculating a planetary attraction constant, which is a product of a gravitational constant and a planetary mass, as a polynomial of the radial coordinate, a radial acceleration and an angular speed, where the radial acceleration is a second order time derivative of the radial coordinate;

a drag force coefficient estimator receiving the plurality of measured states, and calculating a drag force coefficient, which is a drag force acting on the artificial satellite in radial direction with respect to the planetary center divided by a product of the planetary mass, an opposite sign of a radial speed and a squared radial speed, as a polynomial of the radial speed and a function of the radial coordinate monotonically decreasing with respect to increasing radial coordinate;

a rate of convergence calculation unit receiving the drag force coefficient, and calculating a rate of convergence, with which the radial coordinate of the artificial satellite approaches to a radius of the target orbit, as a linear combination of the drag force coefficient divided by the radial speed and a small quantity that is a positive number smaller than an absolute value of the drag force coefficient divided by the radial speed;

a fictitious control calculation unit receiving the planetary attraction constant, the drag force coefficient and the rate of convergence, and calculating a fictitious control, which is a centripetal acceleration required to propel the artificial satellite to the target orbit, as a linear combination of the planetary attraction constant divided by the radial coordinate squared, the drag force coefficient, a product of the rate of convergence and the radial speed, and a small quantity that is a positive number smaller than an absolute value of the planetary constant divided by the radial coordinate squared; and a normalized thrust calculation unit receiving the fictitious control, and calculating a normalized thrust, the thrust normalized with respect to a satellite mass, as a product of the radial coordinate and a first order time derivative of a square root of the fictitious control divided by the radial coordinate.

* * * * *